Figure 1:
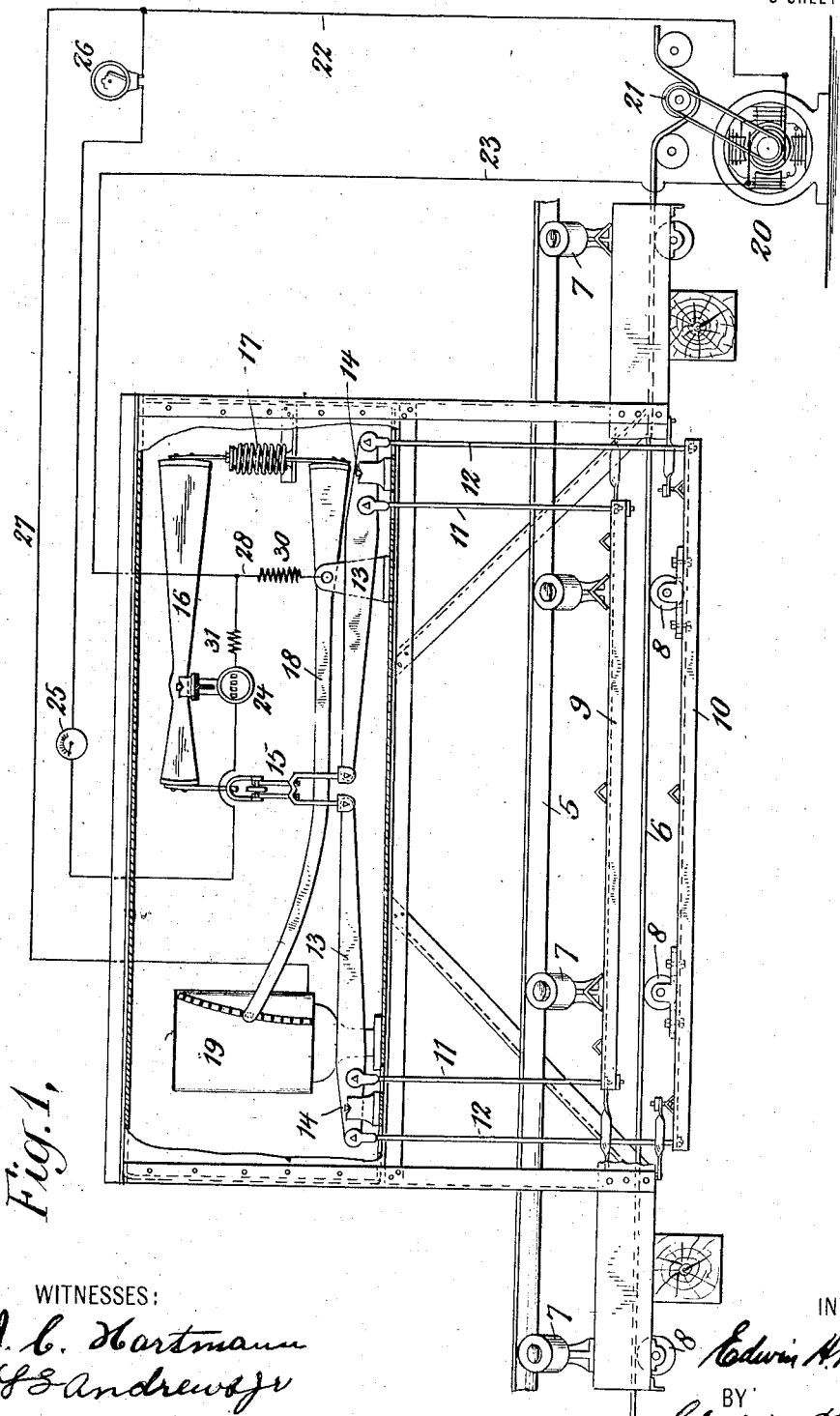

E. H. MESSITER.
INTEGRATING MECHANISM.
APPLICATION FILED FEB. 19, 1910.

1,174,337.

Patented Mar. 7, 1916.
3 SHEETS—SHEET 1.

WITNESSES:
J. C. Hartmann
J. S. Andrews Jr.

INVENTOR
Edwin H. Messiter
BY
Chapin Waymond
his ATTORNEYS

E. H. MESSITER.
INTEGRATING MECHANISM.
APPLICATION FILED FEB. 19, 1910.

1,174,337.

Patented Mar. 7, 1916.
3 SHEETS—SHEET 2.

WITNESSES:
J. C. Hartmann
Y S Andrews Jr

INVENTOR
Edwin H Messiter
BY
Chapin Hayward
his ATTORNEYS

E. H. MESSITER.
INTEGRATING MECHANISM.
APPLICATION FILED FEB. 19, 1910.
1,174,337.
Patented Mar. 7, 1916.
3 SHEETS—SHEET 3.
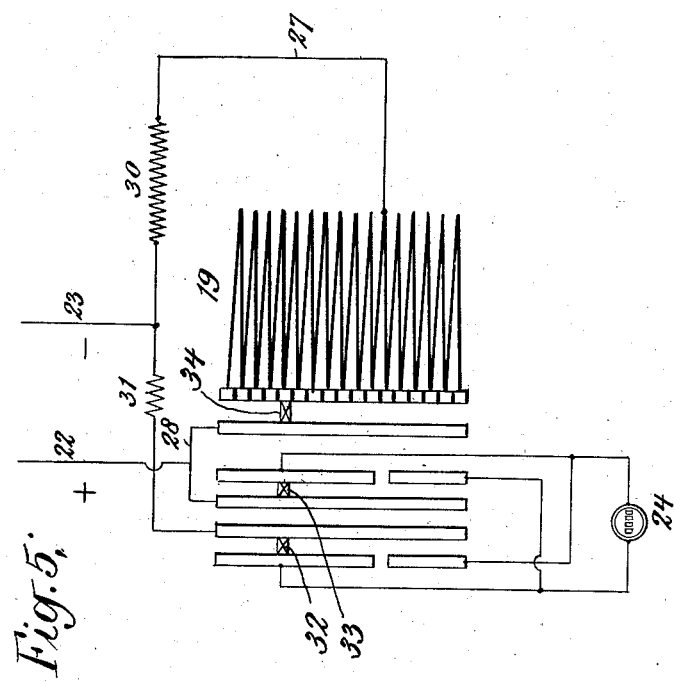
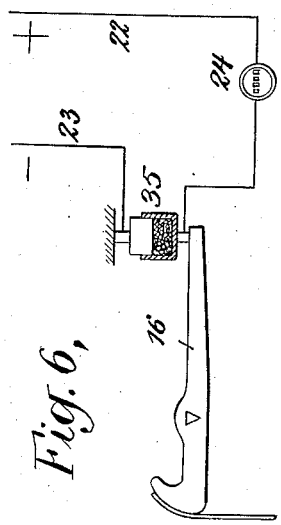
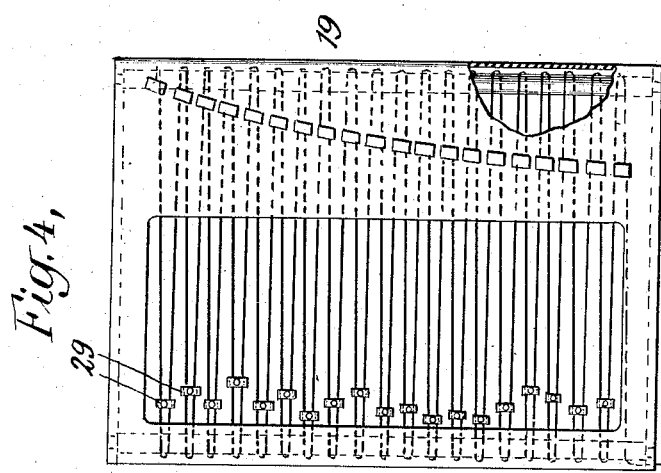
WITNESSES:
J. C. Hartmann
J. F. Andrews Jr
INVENTOR
Edwin H. Messiter
BY
Chapin Maynard
his ATTORNEYS

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

INTEGRATING MECHANISM.

1,174,337.

Specification of Letters Patent.  Patented Mar. 7, 1916.

Application filed February 19, 1910.  Serial No. 544,782.

*To all whom it may concern:*

Be it known that I, EDWIN H. MESSITER, a citizen of the United States of America, and a resident of Brooklyn, county of Kings, and State of New York, have invented certain new and useful Improvements in Integrating Mechanism, of which the following is a specification, reference being had to the accompanying drawings, forming a part thereof.

My invention relates to improvements in integrating mechanism, and particularly to means for integrating a quantity which is the function of two other quantities, one constituting a time component and the other a force component, and a specific application of my invention is the continuous weighing of material as it is being carried by a traveling conveyer.

In continuous weighing mechanism of this character there are two factors to be considered, namely, the weight of the material in passing a given point, and the speed at which the material passes such point, for the product of these two factors for any period of time represents the weight carried past the point during such period. It has been usual heretofore to measure these factors mechanically and integrate them by means of a mechanism having two elements whose combined movements operate upon registering or recording means in proportion to the product thereof. In my present invention, I measure the factors electrically in the following manner and thus dispense with much complicated mechanism, thereby not only saving initial cost but avoiding a fruitful source of errers. For the purpose I provide means for varying the electro-motive force in an electric circuit proportionately to the speed at which the material moves, and means for varying at the same time the quantity of current in the circuit, in proportion to the weight of the moving material, this quantity being also, of course, affected to the proper extent by and in accordance with the electro-motive force thereof; and in connection with this circuit I provide a measuring instrument for measuring the current therein. As it follows that the current so measured in any unit of time bears a direct relation to the weight of the material carried during that time, it will only be necessary to express the result in terms of weight instead of current measurement in order to give the required results.

My invention may therefore be said to consist in proportioning an electric current to the weight of a load and to the speed at which the load moves and in then measuring the current. The different parts of an apparatus for this purpose may be substantially standard instruments. The current may be generated by a small generator geared or belted to run with the conveyer so that its speed is exactly proportionate to the speed of travel of the said conveyer, and a simple form of variable resistance means, operated by the weight of a loaded portion of the belt, arranged either in shunt or series with a current measuring instrument, may be used to vary the quantity of current permitted to pass through the said instrument. The measuring instrument may be a standard form of integrating ampere-hour meter, the registering or recording means thereof being arranged with a suitable notation for the purpose. Other electrical measuring instruments may also be employed, for instance one or more simple indicating ammeters located at different points will indicate at such points the load carried during units of time. If these instruments be recording ones they will make charts showing the fluctuations of the load.

My invention further consists in certain means for compensating for variations in the weight of different parts of the conveyer when running without load, and in certain details of construction and novel combinations all as will be fully pointed out hereinafter, and in order that my invention may be thoroughly understood, I will now proceed to describe an embodiment thereof, having reference to the accompanying drawings illustrating the same, and will then point out the novel features in claims.

Figure 3:
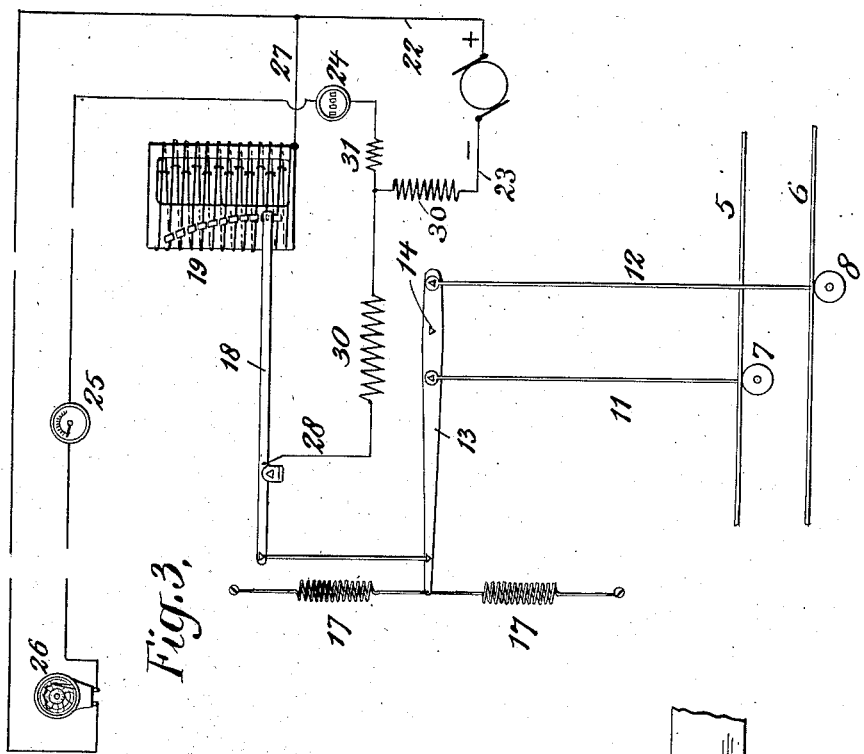
Figure 2:
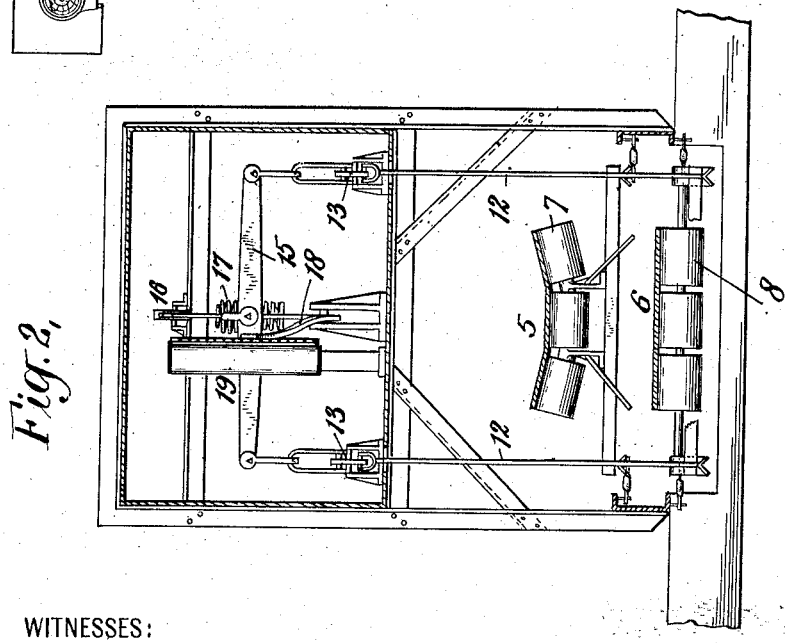

In the drawings: Figure 1 is a view in side elevation of a continuous weighing mechanism constructed in accordance with my invention, showing the same applied to an endless belt conveyer. Fig. 2 is a view in transverse vertical section therethrough. Fig. 3 is a diagrammatic view, showing particularly a set of electric circuits which may be employed. Fig. 4 is a detail view showing a preferred form of construction for a resistance device. Fig. 5 is a detail diagrammatic view of a circuit which may be employed under some circumstances. Fig. 6 is a detail view of a modified form of resistance means which may be employed.

The drawing illustrates parts of an endless belt conveyer for carrying the material to be weighed, the portion 5 being preferably bent up into trough-like form by troughing idler pulleys 7 and constituting the active or loaded portion of the belt, and the portion 6 being supported level by means of idler pulleys 8 and constituting the unloaded return portion of the belt, all as will be well understood by reference to the drawings. A section of each of the belts is supported by means of swinging frames 9 and 10, the frame 9 supporting one or more of the idlers 7 and the frame 10 one or more of the idlers 8. These frames are conveniently connected by suitable connecting elements 11, 12 with scale beams 13 upon opposite sides of their pivotal supports 14, and the said scale beams are connected at their free ends through the medium of an equalizing bar or lever 15 with another scale or beam lever 16,—herein called the "fifth lever." The fifth lever is in turn connected with a weighing spring 17 or similar device and also with one end of a pivoted circuit closing lever 18, the other end of which coöperates with a resistance device 19. In operation the loaded portion of the belt acts upon the system of levers to move the same in proportion to the load carried thereby, moving the circuit closing lever with respect to the resistance device to an extent proportionate to the load. The belt itself, its supports and the suspended frames, counterbalance each other because of their connections 11, 12 being disposed upon the opposite sides of the centers 14 of the levers 13, but attention is called to the fact that I make no claim herein to this construction as the same forms the subject matter of a copending application filed upon even date herewith.

Connected to rotate at a speed directly proportionate to the conveyer belt is a constant-field electric generator 20, the same being shown as connected with a drive pulley 21 engaged by a bight of the return run 10 of the conveyer belt. The generator circuit comprises two line wires 22, 23, and one or more measuring instruments 24, 25, 26 are arranged therein in series with each other. One of the instruments 24 may conveniently be an integrating ampere-hour meter, while the instruments 25, 26 may be indicating and recording ammeters respectively. The resistance device 19 is also arranged in parallel with the line wires 22, 23, through branch wires 27, 28 (see Fig. 3), the former connecting with the resistance wires and the latter with the circuit closing lever 18.

The circuit closing device conveniently comprises a plurality of wires bent backward and forward in the form of a flattened helix, each pair of wires being provided with a permanently adjusted rider 29 by which the amount of resistance presented by each loop may be regulated. By this means the apparatus may be initially adjusted and errors due to friction of moving parts, variations of springs, errors in leverage, errors in the measuring instruments, etc., provided for. In the initial adjustment the belt may be first run free and the resistance adjusted for a neutral condition, in which condition such an amount of current will be allowed to pass through the resistance device as to substantially short circuit the measuring instruments, standard weights being then applied to the belt, and the riders adjusted for the successive resistance loops so that a part of the current is caused to pass through the measuring instruments in proportion to such weights. Thereafter when the belt is running under normal conditions the load carried will be related to the resistance thrown into the line 22, 23, and the speed of the generator being proportionate to the speed of movement of the belt, the electro-motive force in the line will be proportionate to the speed of movement of the load. Hence the instrument 24 should correctly register the total weight carried for any given time. Similarly, the ammeters 24, 25 disposed at various points along the conveyer belt, as may be desired, will correctly indicate and record the load being carried.

Because of the fact that the different parts of the belt will vary in weight owing to wear and other causes, it will follow that sometimes, when the belt is being run idle, the return portion of the belt will be actually heavier than the part ordinarily employed as the active or loaded part, and unless some means be provided for taking care of this condition an error in reading will result. To provide for this I may employ means for reversing the direction of the current through the measuring instrument or instruments after the circuit closing lever 28 has reached its normal unloaded rest position. Such a means is shown in Fig. 5, in which 32, 33 and 34 indicate independent circuit closers carried by the lever 18, the elements 32 and 33 arranged to close circuits through terminals connected in such a way with the line as to constitute pole changing means, while the element 34 closes circuit through the resistance means 19 upon both sides of a neutral point. When the lever 18 passes its neutral point, the current through the instrument 24 will be reversed and the same will be caused to run backward, such movement taking place when the upper part of the belt is lighter than the lower part; this will again be compensated for as the heavier part of the belt becomes the upper part and the lever 18 rises above the said neutral point. The instruments 25 and 26 will at such times give minus indications. This arrangement constitutes a simple and efficient means for compensating for the variations in weight of the belt throughout the length thereof.

Because of the fact that the conductivity of metal varies under changes of temperature it will follow that the resistance thrown into the line by the movement of the circuit closer 18 would vary under changes of temperature unless some means were provided to compensate for this variation in conductivity. As a simple means for such compensation I take advantage of the fact that the conductivity of different metals varies considerably under the same conditions,—for instance, the co-efficient of resistance of copper is about .004 for each rise of one degree centigrade of temperature while the coefficient of German silver is about one-tenth thereof or .0004. Having this in mind, I employ resistance means 30, 31 in the loops through and around the measuring instruments, having different coefficients of resistance, the amount of material being used in the two loops having the required relation to their temperature coefficients of resistance, whereby under rises of temperature the resistance upon the two sides will be varied proportionately and a substantially uniform differential maintained. The amount of resistance thrown in through the device 19 will be small proportionately to the resistance as a whole, and therefore, while there still be a slight error by reason of the variation therein, this error will be largely reduced by the method of compensation above described. Other methods of compensation may, of course, be employed as may be desired.

In Fig. 6 I have shown a modification of the resistance means in which the load is arranged to act with a variable degree of pressure upon carbon contained within a receptacle 35, the same being arranged in series with the measuring instrument or instruments. In this case the increase of load will increase the pressure upon the carbon and thereby decrease the resistance therethrough, the result of which will be to increase the amount of current permitted to pass through the line.

It will be understood that the belt conveyer shown and described is but one form of traveling conveyer to which my invention may be applied.

What I claim is:

1. Continuous weighing mechanism comprising means for continuously conveying a load, an electric circuit, means operatively related to the conveying means for continuously supplying an electric current to said circuit, the said current having an electromotive force proportioned to the speed of operation of the load conveying means, means controlled by the weight of the load being conveyed for varying the current in the said circuit, and an electric meter for the said circuit.

2. Continuous weighing mechanism comprising a conveyer, weighing means over which the conveyer is arranged to pass, an electric circuit, an electric quantity meter therein, and means including a variable resistance device controlled by the said weighing means for varying the amount of current in the said circuit proportionately to the varying movements of the weighing mechanism as the conveyer passes thereover.

3. Continuous weighing mechanism comprising a conveyer, weighing means over which the conveyer is arranged to pass, an electric circuit, an ampere hour meter therein, and means including a variable resistance device controlled by the said weighing means for varying the amount of current in the said circuit proportionately to the varying movements of the weighing mechanism as the conveyer passes thereover.

4. Continuous weighing mechanism comprising means for conveying a load past a given point, an electric circuit, an integrating ampere hour meter therein, a resistance device for controlling the amount of current permitted to pass through the said integrating ampere hour meter, and means operated by the weight of the load to be measured as it passes the given point for variably controlling the said resistance device in accordance with the variations in its weight.

5. Continuous weighing mechanism comprising means for conveying a load, weighing means for supporting a portion of the load conveying means, an electric circuit, means connected with the weighing means for varying the current in the electric circuit as the weight of the load thereon varies, means connected in speed relation with the load conveying means for also varying the current in the electric circuit, as the speed of movement of the load conveying means varies, and an electric measuring device for the current in the said circuit.

6. Continuous weighing mechanism comprising means for conveying a load, weighing means for supporting a portion of the load conveying means, an electric circuit, means connected with the weighing means for varying the current in the electric circuit as the weight of the load thereon varies, means connected in speed relation with the load conveying means for also varying the current in the electric circuit, as the speed of movement of the load conveying means varies, and an integrating electric meter for the current in the said circuit.

7. Continuous weighing mechanism comprising means for conveying a load, weighing means for supporting a portion of the load conveying means, an electric circuit, means connected with the weighing means for varying the current in the electric circuit as the weight of the load thereon varies, means connected in speed relation with the load conveying means for also varying the current in the electric circuit, as the speed of movement of the load conveying means varies, and an integrating ampere hour meter for the current in the said circuit.

8. Continuous weighing mechanism comprising means for conveying a load, weighing means for supporting a portion of the load conveying means, an electric circuit, an integrating ampere hour meter therein, and means connected with the weighing means and in speed relation with the load conveying means, for proportionately varying the amount of current in the said circuit, as the weight of the load to be measured varies, and as the speed of movement of the load conveying means varies, the said current varying means including a variable resistance device.

9. Continuous weighing mechanism comprising means for conveying a load, an electric circuit, an integrating ampere hour meter therein, a resistance device for controlling the amount of current permitted to pass through the said integrating ampere hour meter, means operated by the weight of a load to be measured while being conveyed, for variably controlling the said resistance device in accordance with the variations of the weight of the load to be measured, and means for varying the electro-motive force in the said electric circuit, in accordance with the speed of movement of the load.

10. Continuous weighing mechanism comprising means for carrying a moving load, pressure resisting means acted upon by the weight of the load, an electric generator, means for proportioning the speed of movement of the generator to the speed of movement of the load carrying means, an electric circuit fed by the said generator, means for varying the amount of current in the said circuit proportionately to the weight acting upon the said pressure resisting means, and means for measuring the current in the said circuit.

11. Continuous weighing mechanism comprising means for carrying a moving load, pressure resisting means acted upon by the weight of the load, an electric generator, means for proportioning the speed of movement of the generator to the speed of movement of the load carrying means, an electric circuit fed by the said generator, means for varying the amount of current in the said circuit proportionately to the weight acting upon the said pressure resisting means, and an ammeter for measuring the current in the said circuit.

12. Continuous weighing mechanism comprising means for carrying a moving load, pressure resisting means acted upon by the weight of the load, an electric generator, means for proportioning the speed of movement of the generator to the speed of movement of the load carrying means, an electric circuit fed by the said generator, means for varying the amount of current in the said circuit proportionately to the weight acting upon the said pressure resisting means, and a registering ammeter for measuring the current in the said circuit.

13. Continuous weighing mechanism comprising means for carrying a moving load, pressure resisting means acted upon by the weight of the load, an electric generator, means for proportioning the speed of movement of the generator to the speed of movement of the load carrying means, an electric circuit fed by the said generator, means for varying the amount of current in the said circuit proportionately to the weight acting upon the said pressure resisting means, and a recording ammeter for measuring the current in the said circuit.

14. Continuous weighing mechanism comprising an instrument for measuring electric currents, a generator for the said currents, means for varying the speed of the generator in proportion to the speed of movement of the load to be measured, and means for varying the current in the circuit by, and in accordance with, the varying weight of the moving load as it passes a given point.

15. Weighing mechanism comprising an electric circuit, an electrical measuring instrument therein, a variable resistance device in connection with the said circuit, means for varying the resistance in relation to the load to be measured, and means for reversing the direction of the current in the circuit through the measuring instrument, at a predetermined point in the operation of the mechanism.

16. Weighing mechanism comprising an electric circuit, an electrical measuring instrument for measuring the current therein, a resistance device for controlling the amount of current permitted to pass through the said electrical measuring instrument, means operated by the weight of the load to be measured for controlling the said resistance device in accordance with the weight of the load to be measured, and means operated when the last said means reaches a predetermined point for reversing the current through the electric circuit.

17. Weighing mechanism comprising means for proportioning an electric current to the weight of a load, means for reversing the current when the load becomes a minus quantity, and means for measuring the current.

18. Continuous weighing mechanism comprising a conveyer, weighing means continuously influenced by the material carried by the conveyer, an electric circuit, means responsive to two determining factors in the circuit for measuring the total weight of the material conveyed, and means whereby said determining factors are respectively controlled by the speed of the conveyer and the aforesaid weighing means.

19. Continuous weighing mechanism comprising a conveyer, weighing means continuously influenced by the material carried by the conveyer, an electric circuit, means responsive to the voltage and current in the circuit for measuring the total weight of the material conveyed, and means whereby the voltage and the current are respectively controlled by the speed of the conveyer and the aforesaid weighing means.

20. Continuous weighing mechanism comprising a conveyer, weighing means continuously influenced by the load carried by a portion of the conveyer, an electric circuit, means responsive to the power consumed in the circuit for measuring the total weight of the material conveyed, and means whereby the electro-motive force and the resistance of said circuit are respectively controlled by the speed of the conveyer and the aforesaid weighing means.

In witness whereof I have hereunto set my hand this 15th day of February, 1910.

EDWIN H. MESSITER.

Witnesses:
D. HOWARD HAYWOOD,
LYMAN S. ANDREWS, Jr.